3,320,302
ALKYL(ARYLOXYETHYL)CARBAMATES
AND PROCESS
George Edward Ham and Leonard Levine, Lake Jackson, Tex., assignors to The Dow Chemical Company, Midland, Mich., a corporation of Delaware
No Drawing. Filed Nov. 13, 1963, Ser. No. 323,253
10 Claims. (Cl. 260—471)

This invention relates to new compositions useful as bactericides and to the preparation of such compositions. More particualrly, the present invention relates to carbamates which contain an aryl group, to the manufacture of such compounds, and to the use of these compounds as bactericides.

It is known that thiophenol will react with esters of 1-aziridinylcarboxylic acid, as disclosed by Iwakura et al. in J. Org. Chem., 26, 4384–8 (1961). Phenol, on the other hand, was found to be much less reactive. Iwakura et al. reported that o-cyclohexyl-N,N-ethylene urethane did not react with phenol after standing for a year at room temperature nor with an excess of phenol for four hours at 100° C.

It has now been found that phenol and alkyl-substituted phenols react with alkyl esters of 1-aziridinylcarboxylic acid to form alkyl aryloxyethylcarbamates in the presence of a Lewis acid (electron acceptor) or a base. The reaction can be represented by the following equation:

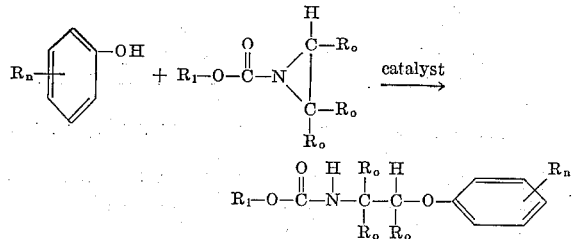

wherein each R is hydrogen, or an alkyl group of from 1 to 3 carbon atoms, $n$ is an integer from 0 to 3 representing the number of R substituents (which may be the same or different) attached to the aromatic nucleus, $R_1$ is an alkyl group of from 1 to 6 carbon atoms, each $R_o$ is a hydrogen atom or a lower alkyl group of from 1 to 4 carbon atoms, and all unsubstituted positions on the aryl group are attached to hydrogen atoms. The R-alkyl groups include methyl, ethyl, n-propyl, and i-propyl radicals. $R_o$ may be any R group or, for example, an n-butyl, i-butyl, sec.-butyl, or tert.-butyl group. $R_1$ may be any $R_o$ group or a group such as a n-pentyl, i-pentyl, n-hexyl, i-hexyl, etc. group.

Typical hydroxyaryl reactants include phenol, the cresols (o-, m-, and p-methyl phenol), thymol, α-naphthol, β-naphthol, and carvacrol. These hydroxyaryl compounds may be reacted with esters such as methyl 2,3-diethyl-1-aziridinylcarboxylate, n-hexyl 2-n-butyl-1-aziridinylcarboxylate, i-propyl 1-aziridinylcarboxylate, and i-pentyl 1-aziridinylcarboxylate to produce the corresponding carbamates. At least stoichiometric amounts of reactants are usually employed, with mole ratios of from .5:1 to 6:1 (hydroxyaryl compound:alkyl aziridinylcarboxylate) being suitable. Best results are obtained with at least 2 moles of hydroxyaryl compound per mole of alkyl aziridinylcarboxylate.

The reaction may be carried out at a temperature of from 25° C. to 200° C. (preferably from 80° C. to 160° C.). The reaction is not pressure sensitive and pressures of from a few hundredths of a mm. of Hg up to several hundred atmospheres may be used. Most economical operation is generally obtained by carrying out the process either continuously or batchwise at atmospheric pressure.

It is not necessary to use a solvent in the process, although various inert solvents such as benzene, dioxane, diethyl ether, acetonitrile, chloroform and tetrahydrofurans may be used if desired.

The catalyst may be a Lewis acid (such as $BF_3$, $BCl_3$, $SnCl_4$, $ZnCl_2$, or other electron acceptors that behave like a proton), a conventional acid (such as $H_2SO_4$), or a conventional base such as NaOH, KOH, potassium tertiary-butoxide, sodium methylate, sodium ethylate, potassium methylate, or potassium ethylate, as well as other alkali metal and alkaline earth oxides, and hydroxides ($Ca(OH)_2$, CaO, etc.). Mixtures of catalysts may also be used, for example, a mixture of $SnCl_4$ and $BF_3$ may be used. Only a catalytic amount is necessary and amounts of up to 0.05 mole of catalyst per mole of hydroxyaryl compound are generally sufficient. The compounds of the invention are useful as bactericides due to the presence of both an amide nitrogen atom and an aryloxy group in the molecule. The compounds are especially effective in inhibiting the growth of E. coli and can be used in either concentrated or dilute solutions (or dispersions) in various solvents (water, benzene, toluene, heptane) or inert carriers (diatomaceous earth, talc).

The following examples are submitted for the purpose of illustration only and are not to be construed as limiting the scope of the invention in any way.

Example I

To a solution of 116 grams (1.23 moles) of phenol and 1.5 milliliters of boron trifluoride etherate (48 percent by weight of $BF_3$ in diethyl ether) at 148–151° C. was added dropwise 40 grams (0.35 mole) of ethyl-1-aziridinylformate (ethyl 1-aziridinylcarboxylate). After standing for several hours to cool, benzene and water were added to the reaction mixture. The aqueous layer was made basic with dilute sodium hydroxide at ice bath temperature. The layers were separated, and the organic layer was washed several times with water and then dried. The organic solution was filtered and concentrated. Vacuum distillation yielded 26 grams (35% of theory) of ethyl 2-phenoxyethylcarbamate ($C_{11}H_{15}NO_3$). A sample was redistilled giving a product with a boiling point of 97–98° C. (0.8 mm. Hg) and $n_D^{26} = 1.5120$.

A sample of the ethyl 2-phenoxyethylcarbamate product was refluxed with concentrated HCl to produce 2-phenoxyethylamine hydrochloride. The melting point of the derivative (after recrystallization from dioxane containing a small amount of methanol) was 210–213° C.

Example II

To 51 grams (0.54 mole) of phenol and 0.3 gram of sodium methylate at 118–123° C. was added 17.6 grams (0.153 mole) of ethyl-1-aziridinylformate. The reaction solution was diluted with diethyl ether and then washed several times with water. After drying, the organic solution was concentrated and distilled. Vacuum distillation gave 14 grams (44% of theory) of ethyl 2-phenoxyethylcarbamate. The material solidified. A sample of the product was recrystallized by dissolving in benzene and then adding 5 volumes of petroleum ether; M.P. 42–44° C.

Analysis.—Calculated for $C_{11}H_{15}NO_3$: N, 6.69. Found: N, 6.65.

The infrared spectra of the product in solution was identical to the product of Example I.

Example III

The ethyl(2-phenoxyethyl)carbamate prepared in the above examples was tested as a bactericide by streaking the compound in a nutrient agar which was cross-streaked with E. coli. The streaked agar was incubated at 25°

C. for 2 days. *E. coli* did not grow at the place where a streak of the bacterial suspension crossed the streak of test compound, while it flourished in all other inoculated areas.

*Examples IV–X*

Table 1 gives a comparison of the yields obtained under various reaction conditions both with and without a catalyst. The procedure followed was similar to that of Examples I and II.

TABLE I

| Example No. | Moles of Reactants | | Catalyst (grams) | Reaction Temp. (° C.) | Reaction Time (hrs.) | Percent Yield Based on Ethyl Aziridinyl Formate |
|---|---|---|---|---|---|---|
| | Phenol | Ethyl Aziridinyl Formate | | | | |
| IV | 0.50 | 0.20 | None | 40–43 | 20 | 6 |
| V | 0.54 | 0.15 | 0.5 (BF$_3$·(CH$_3$CH$_2$)$_2$O) | 120–25 | 4 | 14 |
| VI | 0.54 | 0.15 | 0.5 (BF$_3$·(CH$_3$CH$_2$)$_2$O) | 120–25 | 4 | 38 |
| VII | 1.23 | 0.35 | 1.5 (BF$_3$·(CH$_3$CH$_2$)$_2$O) | 30–35 | 72 | 20 |
| VIII | 1.23 | 0.35 | 1.5 (BF$_3$·(CH$_3$CH$_2$)$_2$O) | 69–75 | 5.2 | 47 |
| IX | 0.54 | 0.15 | 0.3 (NaOCH$_3$) | 118–123 | 4.2 | 44 |
| X | 1.23 | 0.35 | 0.8 (NaOCH$_3$) | 70–80 | 60 | 28 |

In an experiment carried out to compare reaction rates, equimolar amounts (0.2 mole) of phenol and ethyl aziridinylformate were combined without a catalyst and in the presence of 1.0 milliliter of BF$_3$·(CH$_3$CH$_2$)$_2$O catalyst. Titration of each mixture after 30 minutes showed that the reaction was 84% complete with the catalyst, whereas only 2% reaction had occurred in the same time without the catalyst.

We claim as our invention:

1. A compound of the formula

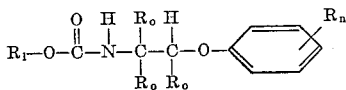

wherein:
(a) each R group is independently selected from the group consisting of a hydrogen atom and an alkyl group of from 1 to 3 carbon atoms,
(b) *n* is an integer from 0 to 3 which represents the number of alkyl R groups attached to the aromatic nucleus,
(c) R$_o$ is selected from the group consisting of the hydrogen atom and a lower alkyl group, and
(d) R$_1$ is an alkyl group of from 1 to 6 carbon atoms.

2. A compound of the formula:

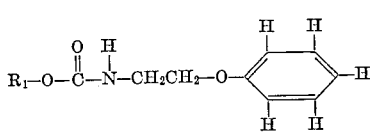

wherein R$_1$ is an alkyl group of from 1 to 6 carbon atoms.

3. The compound

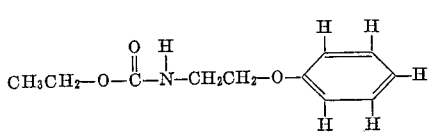

4. A method of preparing a compound of claim 1 which comprises reacting
(A) a compound of the formula

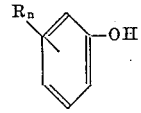

and (B) a compound of the formula

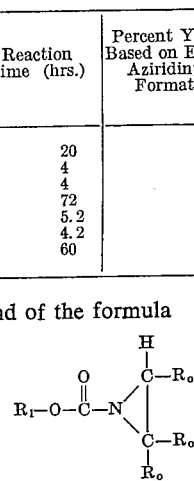

wherein:
(a) each R group is independently selected from the group consisting of a hydrogen atom and an alkyl group of from 1 to 3 carbon atoms,
(b) *n* is an integer from 0 to 3 which represents the number of alkyl R groups attached to the aromatic nucleus,
(c) R$_o$ is selected from the group consisting of the hydrogen atom and a lower alkyl group, and
(d) R$_1$ is an alkyl group of from 1 to 6 carbon atoms, in the presence of a catalyst selected from the group consisting of a Lewis acid, H$_2$SO$_4$, an alkali metal alkoxide wherein the alkoxy moiety contains from 1 to 4 carbon atoms, an alkali metal hydroxide, an alkali metal oxide, an alkaline earth metal oxide and an alkaline earth metal hydroxide.

5. The process of claim 4 wherein the catalyst is BF$_3$.

6. The process of claim 4 wherein the catalyst is NaOH.

7. The process of claim 4 wherein the catalyst is NaOR$_4$ and wherein R$_4$ is an alkyl group of from 1 to 4 carbon atoms.

8. A process for the preparation of an alkyl 2-phenoxyethylcarbamate which comprises reacting phenol with an alkyl 1-aziridinylcarboxylate wherein the alkyl moiety contains from 1 to 6 carbon atoms in the presence of BF$_3$ catalyst at a temperature of from 25° C. to 200° C.

9. The process of claim 8 wherein the reaction is carried out in the presence of acetonitrile.

10. A process for the preparation of a lower alkyl 2-phenoxyethylcarbamate which comprises reacting phenol with a lower alkyl 1-aziridinylcarboxylate in the presence of a catalytic amount of sulfuric acid at a temperature of from 25° C. to 200° C.

No references cited.

LORRAINE A. WEINBERGER, *Primary Examiner.*

L. ARNOLD THAXTON, *Assistant Examiner.*